(12) United States Patent
Nakamura

(10) Patent No.: US 11,645,771 B2
(45) Date of Patent: May 9, 2023

(54) MEASURING SYSTEM AND RECORDING MEDIUM STORING THEREON A MEASURING PROGRAM

(71) Applicant: KABUSHIKI KAISHA TOSHIBA, Tokyo (JP)

(72) Inventor: Hiroaki Nakamura, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/474,554

(22) Filed: Sep. 14, 2021

(65) Prior Publication Data

US 2022/0270272 A1 Aug. 25, 2022

(30) Foreign Application Priority Data

Feb. 22, 2021 (JP) .............................. JP2021-026414

(51) Int. Cl.
*G06T 7/50* (2017.01)
*G06T 7/73* (2017.01)
(Continued)

(52) U.S. Cl.
CPC ................ *G06T 7/50* (2017.01); *G01B 11/22* (2013.01); *G01B 11/24* (2013.01); *G06T 7/73* (2017.01); *H04N 5/23222* (2013.01); *G06T 2207/10024* (2013.01); *G06T 2207/10028* (2013.01); *G06T 2207/30204* (2013.01); *G06T 2207/30244* (2013.01)

(58) Field of Classification Search
CPC ... G06T 7/50; G06T 7/73; G06T 2207/10024; G06T 2207/10028; G06T 2207/30204; G06T 2207/30244; G06T 7/001; G01B 11/22; G01B 11/24; H04N 5/23222; H04N 17/002

See application file for complete search history.

(56) References Cited

U.S. PATENT DOCUMENTS 9,251,590 B2 * 2/2016 Sharp ...................... G06T 7/593
2017/0118374 A1 * 4/2017 Tsujiguchi .............. G06F 3/147
(Continued)

FOREIGN PATENT DOCUMENTS

JP 2015-153035 A 8/2015
JP 2018-84954 A 5/2018
(Continued)

*Primary Examiner* — Michael E Teitelbaum
(74) *Attorney, Agent, or Firm* — Maier & Maier, PLLC

(57) ABSTRACT

A measuring system includes a processor. The processor calculates first information. The first information indicates a position and an attitude of a camera. The camera measures depth information along with an image of a measurement target. The processor extract second shape information from first shape information based on the first information. The first shape information indicates a three-dimensional shape of the measurement target. The second shape information indicates a three-dimensional shape corresponding to an imaging range of the camera. The processor calculates second information based on a result of a comparison between the depth information and the second shape information. The second information indicates the position and the attitude of the camera with a higher precision than the first information.

6 Claims, 8 Drawing Sheets

(51) Int. Cl.
*H04N 5/232* (2006.01)
*G01B 11/22* (2006.01)
*G01B 11/24* (2006.01)

(56) References Cited

U.S. PATENT DOCUMENTS

| | | |
|---|---|---|
| 2018/0144500 A1 | 5/2018 | Lam et al. |
| 2020/0037943 A1* | 2/2020 | Chaja .................... A61B 5/165 |
| 2021/0090286 A1* | 3/2021 | Fujiwara .................. G06T 7/73 |
| 2021/0189697 A1 | 6/2021 | Takahama et al. |
| 2021/0243362 A1* | 8/2021 | Castillo .................... G06T 7/12 |

FOREIGN PATENT DOCUMENTS

| | | |
|---|---|---|
| JP | 2019-101987 A | 6/2019 |
| JP | 2019-209461 A | 12/2019 |
| JP | 2020-2716 A | 1/2020 |

* cited by examiner

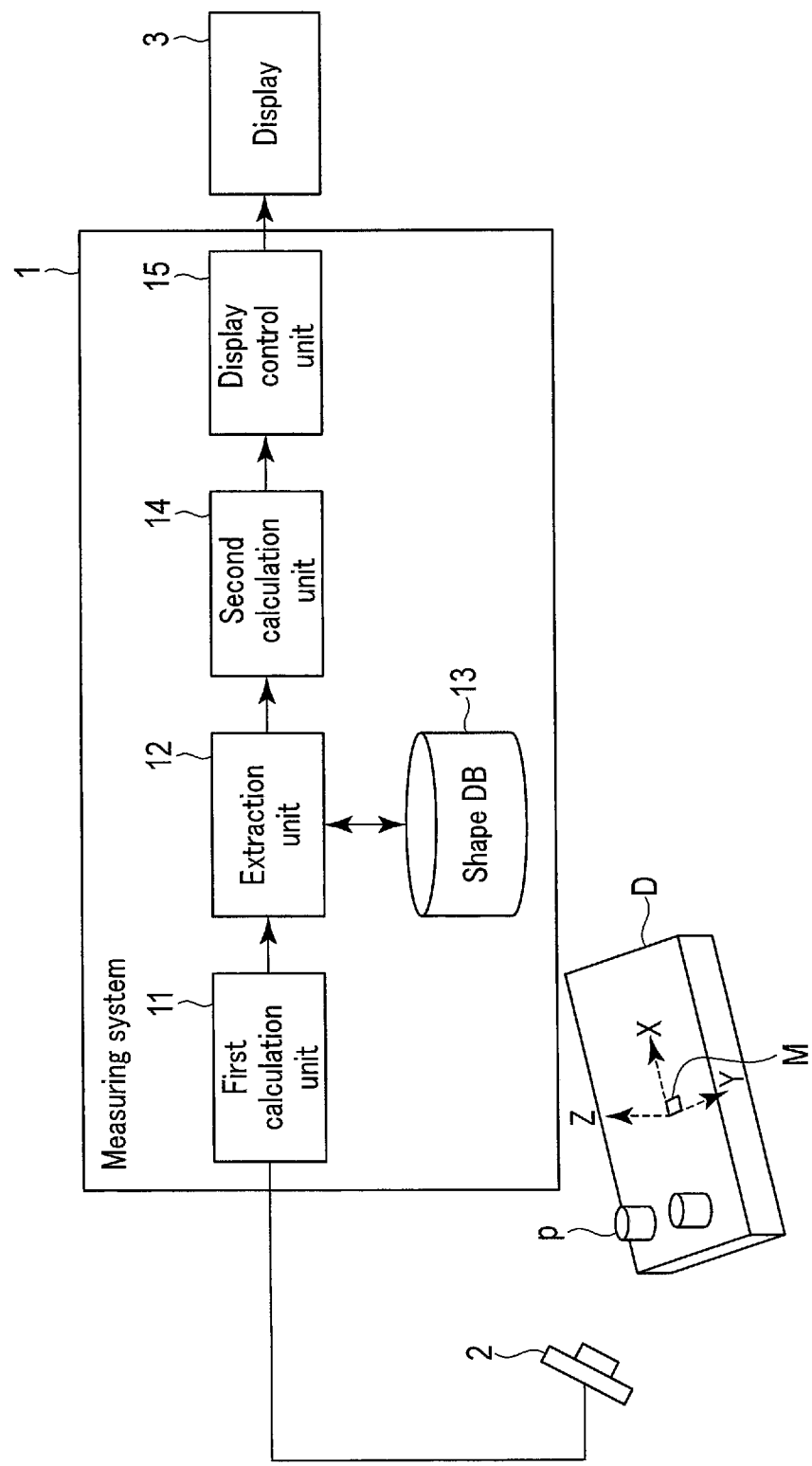
F I G. 1

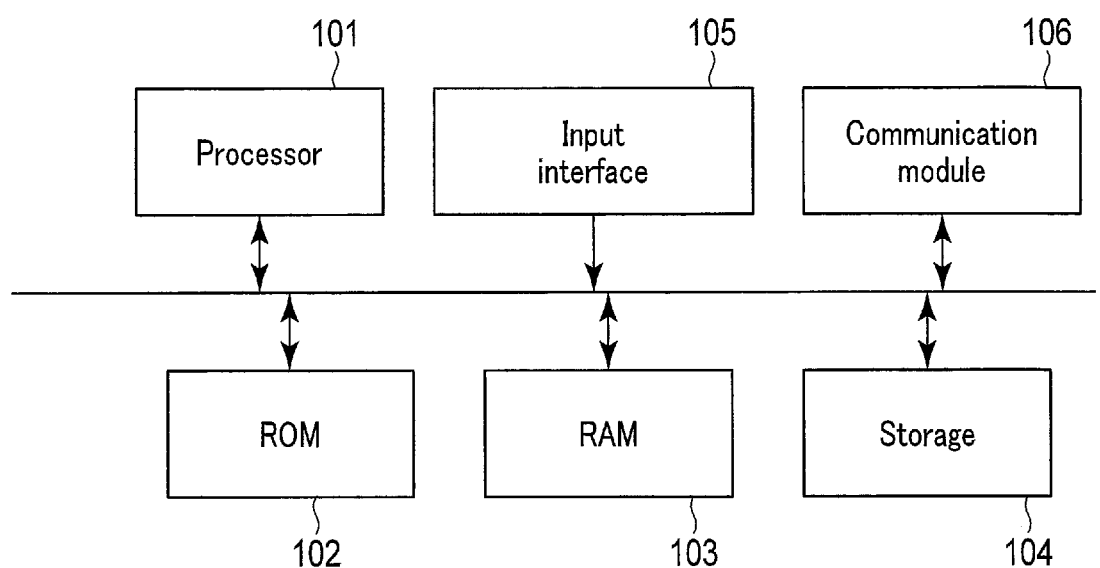
F I G. 2

MEASURING SYSTEM AND RECORDING MEDIUM STORING THEREON A MEASURING PROGRAM

CROSS-REFERENCE TO RELATED APPLICATIONS

This application is based upon and claims the benefit of priority from Japanese Patent Application No. 2021-026414, filed Feb. 22, 2021, the entire contents of which are incorporated herein by reference.

FIELD

Embodiments described herein relate generally to a measuring system and a recording medium storing thereon a measuring program.

BACKGROUND

Iterative Closest Point (ICP) is known as a technique for matching data of two point clouds according to the same measurement target. A matching technique such as the ICP technique may be applied to, for example, an image comparison process for checking that parts are correctly assembled.

In a matching technique such as the ICP technique, the amount of processing time tends to increase when the number of point clouds is large. Accordingly, if a matching technique such as the ICP technique were simply applied to a part assembly system, the real-time properties at the time of measurement might be lost.

BRIEF DESCRIPTION OF THE DRAWINGS

FIG. 1 is a block diagram showing a configuration of an example of a measuring system according to a first embodiment.

FIG. 2 is a diagram showing an example of a hardware configuration of the measuring system.

DETAILED DESCRIPTION

Figure 3:
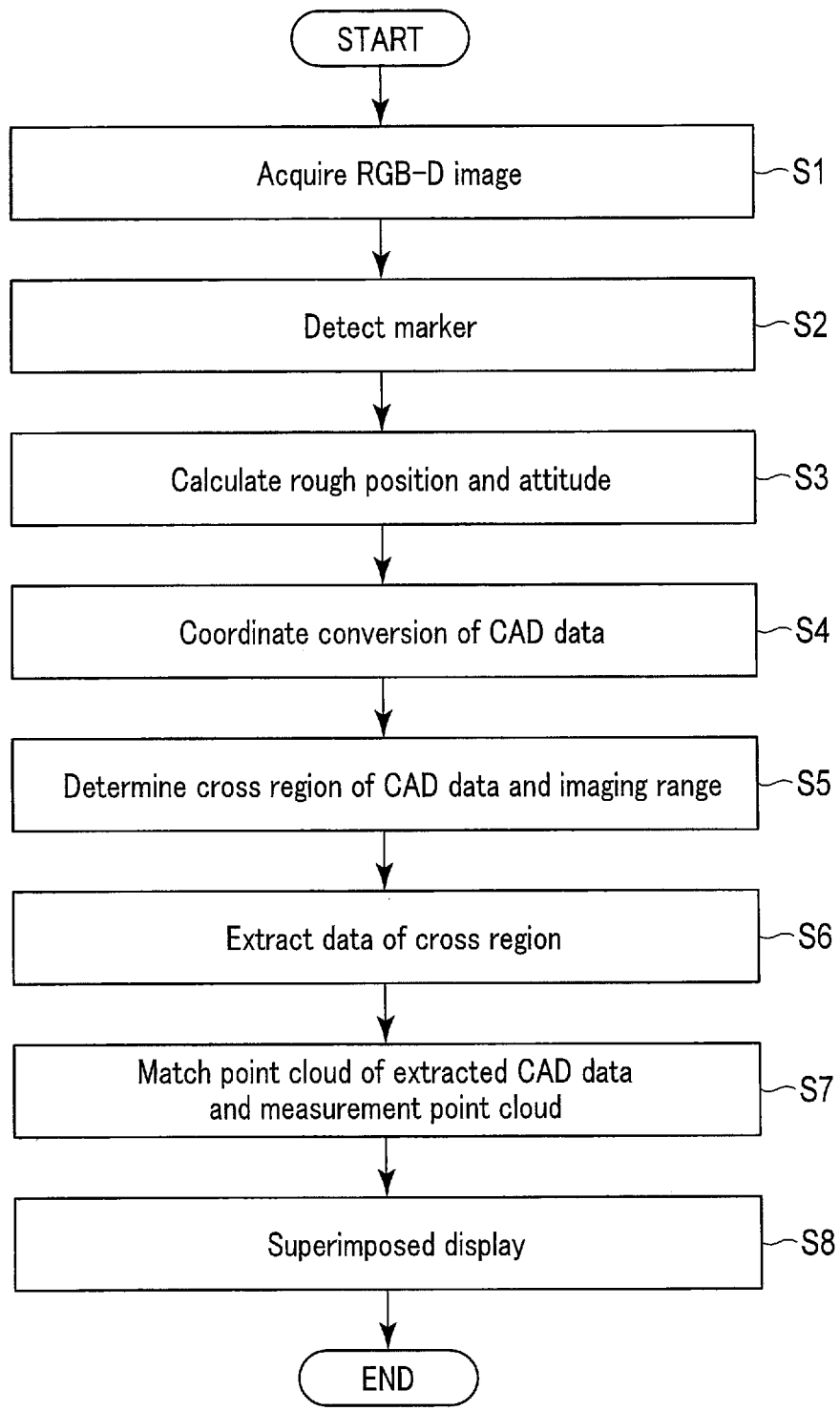
FIG. 3 is a flowchart showing an operation of the measuring system according to the first embodiment.

In general, according to one embodiment, a measuring system comprising a processor including hardware. The processor calculates first information with reference to a marker provided in a measurement target. The first information indicates a position and an attitude of a camera. The camera measures depth information indicating a depth to each point of the measurement target, along with an image of the measurement target. The processor extracts second shape information from first shape information based on the first information. The first shape information indicates a three-dimensional shape of the measurement target. The second shape information indicating a three-dimensional shape corresponding to an imaging range of the camera. The processor compares the depth information with the second shape information. The processor calculates second information based on a result of the comparison between the depth information and the second shape information. The second information indicates the position and the attitude of the camera with a higher precision than the first information. The processor causes a display to display information relating to the result of the comparison between the depth information and the second shape information based on the second information.

Hereinafter, embodiments will be described with reference to the drawings.

First Embodiment

FIG. 1 is a block diagram showing a configuration of an example of a measuring system according to a first embodiment. The measuring system 1 shown in FIG. 1 may be used for measurement in an assembly system of parts. A measurement target of the measuring system 1 is, for example, a part p assembled into a device D. The part p, which is a measurement target, is mechanically assembled into the device D by, for example, an assembly system. A configuration of the assembly system is not limited to a particular one. The part p may be assembled into the device D by, for example, a person.

The measuring system 1 according to the embodiment compares information on a three-dimensional shape of the device D measured by a camera 2 and information indicating the three-dimensional shape of the device D prepared in advance, and presents a result of the comparison to the user. The user is, for example, a worker who checks whether the part p is correctly assembled into the device D.

As shown in FIG. 1, the measuring system 1 includes a first calculation unit 11, an extraction unit 12, a shape database (DB) 13, a second calculation unit 14, and a display control unit 15. The measuring system 1 is configured to be communicable with the camera 2. The communication between the measuring system 1 and the camera 2 may be either wireless or wired. The measuring system 1 is configured to be communicable with the display 3. The communication between the measuring system 1 and the display 3 may be either wireless or wired.

The camera 2 is, for example, a camera gripped by the user and configured to measure depth information of a measurement target together with an image of the measurement target. The depth information is information on a distance from the camera 2 to each point on a surface of the device D. The measurement of the depth information by the camera 2 may be performed by, for example, projecting and receiving twin-lens infrared light. However, the measurement of the depth information is not limited thereto. The depth information may be measured by, for example, a light detecting and ranging (LiDAR) method. The camera 2 may be an RGB-D camera. An RGB-D camera is a camera configured to measure an RGB-D image. An RGB-D image includes a depth image and a color image (RGB color image). A depth image is an image that contains a depth of each point of a measurement target as a pixel value. A color image is an image that contains an RGB value of each point of a measurement target as a pixel value. The camera 2 may be a camera capable of measuring a gray-scale image, instead of a color image.

The display 3 is a display such as a liquid crystal display or an organic EL display. The display 3 displays various types of images based on data transferred from the measuring system 1.

The first calculation unit 11 calculates first information indicating a position and an attitude of the camera 2 that has photographed the device D, with reference to a marker M arranged in the device D in advance. The marker M is a marker having a known size and arranged in a predetermined orientation at a predetermined position of the device D. For example, the marker M is arranged in a predetermined position of the device D in such a manner that its two sides orthogonal to each other are parallel to predetermined X and Y axes on a surface of the device D, and that its normal is parallel to a predetermined Z axis on the surface of the device D. The marker M is, for example, an augmented reality (AR) marker, and may be recognized based on an image acquired by the camera 2. Two or more markers M may be arranged on a single surface of the device D. The markers M may be arranged on two or more surfaces of the device D.

Of known three-dimensional shape information of the measurement target stored in the shape DB 13, the extraction unit 12 extracts, based on first information, three-dimensional shape information corresponding to an imaging range of depth information of the camera 2. As will be described later, the imaging range of the depth information is a square pyramidal range with reference to the camera 2.

The shape DB 13 stores known three-dimensional shape information of the measurement target. The known three-dimensional shape information may be, for example, design drawing data based on a 3D computer-aided design (CAD) of the device D including the measurement target. The known three-dimensional shape information is not limited to design drawing data, and may be data of a given point cloud, or data that can be converted into data of a point cloud. Also, the shape DB 13 may be provided outside the measuring system 1. In this case, the extraction unit 12 of the measuring system 1 acquires information from the shape DB 13 as necessary. The known three-dimensional shape information may be input to the measuring system 1 by the user, instead of being registered in the shape DB 13.

The second calculation unit 14 compares depth information measured by the camera 2 and three-dimensional shape information extracted by the extraction unit 12. Specifically, the second calculation unit 14 compares data on a measurement point cloud generated from depth information and data on a point cloud that configures three-dimensional shape information, and performs data matching of the two point clouds, thereby calculating second information indicating the position and the attitude of the camera 2 with a higher precision than the first information. The data matching of the point clouds may be performed by an iterative closest point (ICP) technique, a coherent point drift (CPD) technique, etc.

The display control unit 15 displays, based on the second information, information on a shape comparison result by the second calculation unit 14 on the display 3. The information on the shape comparison result is, for example, an image obtained by overlaying an image based on a point cloud of a measurement target stored in the shape DB 13 on an image based on a point cloud measured by the camera 2. The display control unit 15 associates the image measured by the camera 2 with a point cloud obtained from the depth information measured by the camera 2 based on, for example, the high-precision position and attitude of the camera 2, thereby generating a three-dimensional model of the measurement target. The display control unit 15 overlays a three-dimensional model based on the known three-dimensional shape information on the generated three-dimensional model of the measurement target, and displays it on the display 3.

FIG. 2 is a diagram showing an example of a hardware configuration of the measuring system 1. The measuring system 1 may be a terminal device of various types, such as a personal computer (PC), a tablet terminal, etc. As shown in FIG. 2, the measuring system 1 includes a processor 101, a ROM 102, a RAM 103, a storage 104, an input interface 105, and a communication module 106 as hardware.

The processor 101 is a processor that controls the overall operation of the measuring system 1. The processor 101 executes, for example, programs stored in the storage 104, thereby operating as a first calculation unit 11, an extraction unit 12, a second calculation unit 14, and a display control unit 15. The processor 101 is, for example, a central processing unit (CPU). The processor 101 may be, for example, a microprocessing unit (MPU), a graphics processing unit (GPU), an application-specific integrated circuit (ASIC), a field-programmable gate array (FPGA), etc. The processor 101 may be, for example, either a single CPU or a plurality of CPUs.

A read-only memory (ROM) 102 is a non-volatile memory. The ROM 102 stores an activation program, etc. of the measuring system 1. A random access memory (RAM) 103 is a volatile memory. The RAM 103 is used as, for example, a working memory during the processing at the processor 101.

The storage 104 is, for example, a storage such as a hard disk drive or a solid-state drive. The storage 104 stores various types of programs executed by the processor 101, such as a measuring program. The storage 104 may store the shape DB 13. The shape DB 13 need not necessarily be stored in the storage 104.

The input interface 105 includes input devices such as a touch panel, a keyboard, and a mouse. When an operation is performed on an input device of the input interface 105, a signal corresponding to a content of the operation is input to the processor 101. The processor 101 performs various processes in response to this signal.

The communication module 106 is a communication module for allowing the measuring system 1 to communicate with external devices such as the camera 2 and the display 3. The communication module 106 may be a communication module for either wired or wireless communications.

Next, an operation of the measuring system 1 according to the first embodiment will be described. FIG. 3 is a flowchart showing an operation of the measuring system 1 according to the first embodiment. The processing of FIG. 3 is executed by the processor 101. Herein, a case will be described where the camera 2 is an RGB-D camera, and the known three-dimensional shape information is an example of 3D CAD data of the device D. However, as described above, the camera 2 need not be an RGB-D camera, and the known three-dimensional shape information need not be 3D CAD data of the device D.

At step S1, the processor 101 acquires an RGB-D image of the device D including a part p, which is a measurement target, from the camera 2.

At step S2, the processor 101 detects a marker M from a color image acquired from the camera 2. The processor 101 converts the color image acquired from the camera 2 into, for example, a gray-scale image, further converts the gray-scale image into a black-and-white binary image, compares the black-and-white binary image with a pattern of the marker M stored in advance, and thereby detects the marker M. The detection technique of the marker M is not limited thereto.

At step S3, the processor 101 calculates a position and an attitude of the camera 2. The processor 101 calculates a position and an attitude of the camera 2 based on a position, a size, and an orientation of the marker M detected in the color image. The marker M is arranged in a predetermined orientation at a predetermined position of the device D. Based on the position, the size, and the orientation of the marker M in the color image, the position and the attitude of the camera 2 with respect to the device D can be calculated. Based on, for example, the position and the size of the marker M in the color image, a distance from the camera 2 to the marker M, namely, the position of the camera 2, can be calculated. Also, based on an inclination of each side (each axis) of the marker M in the color image, an inclination of the camera 2 with respect to the device D, namely, the attitude of the camera 2, can be calculated.

At step S4, the processor 101 performs coordinate conversion of 3D CAD data. Specifically, the processor 101 acquires 3D CAD data of the device D from the storage 104. Based on the calculated position and attitude of the camera 2, the processor 101 converts values of coordinates of each point in the 3D CAD data into values in a coordinate system of the camera 2. For example, the processor 101 applies a transformation matrix calculated based on the position and attitude of the camera 2 to values of coordinates of each point in the 3D CAD data, thereby allowing the coordinates of each point in the 3D CAD data to be moved in parallel and rotate.

Figure 4:
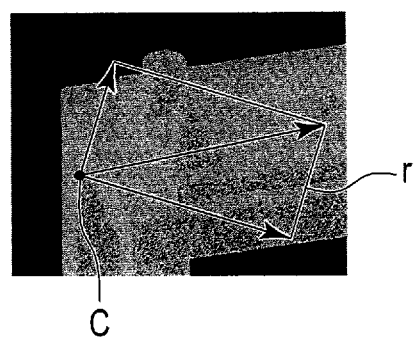
FIG. 4 is a diagram showing a concept of a cross region.

At step S5, the processor 101 determines a cross region where a point cloud in the 3D CAD data and an imaging range of the camera 2 cross. FIG. 4 is a diagram showing a concept of a cross region. When a depth direction is also taken into account, an imaging range of the camera 2 is represented by a square pyramidal range formed around an optical axis of the camera 2. Assuming, for example, that the camera 2 is at the position of a point C in FIG. 4, an imaging range r of the camera 2 is a square pyramidal range having the point C as the vertex and the optical axis of the camera 2 as the normal. The cross region is a region where the square pyramidal imaging range r and a point cloud configuring the 3D CAD data overlap. Here, assuming that the position and the attitude of the camera 2 are known and an angle of view or a focal length of the camera 2 at the time of photography is known, the square pyramidal imaging range r can be represented by values in the coordinate system of the camera 2. At step S5, the processor 101 determines, of the square pyramidal imaging range r, a range including values of coordinates of the point clouds of the 3D CAD data as a cross region. Taking into account calculation errors of the position and the attitude of the camera 2, the cross region may include some margin region.

At step S6, the processor 101 extracts 3D CAD data included in the cross region of the 3D CAD data. The camera 2 measures depth information in the imaging range. Accordingly, data on a measurement point cloud generated from the depth information is also limited to data in the imaging range of the camera 2. Thus, it suffices that the 3D CAD data contains data in the imaging range of the camera 2. In the embodiment, the 3D CAD data is restricted according to the imaging range of the camera 2 in order to reduce the processing time of matching of point clouds.

At step S7, the processor 101 performs matching of data of a point cloud that configures the extracted 3D CAD data and data on a measurement point cloud generated from the depth information, thereby calculating the high-precision position and attitude of the camera 2. The data on the measurement point cloud may be generated by synthesizing the depth information and the color image data after performing alignment using the ICP technique, the CPD technique, etc. In the embodiment, since the number of point clouds of the 3D CAD data is restricted according to the imaging range, it can be expected that matching will be completed in a short period of time.

At step S8, the processor 101 superimposes a three-dimensional image of the measurement target based on the 3D CAD data on a three-dimensional image of a measurement target based on depth information measured by the camera 2, and displays the superimposed image on the display 3. Thereafter, the processor 101 terminates the processing of FIG. 3.

Figure 5A:
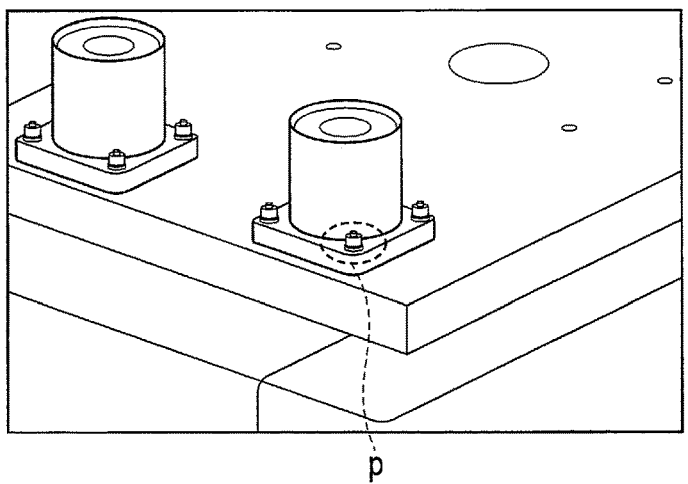
FIG. 5A is a diagram showing an example of a display process.
Figure 5B:
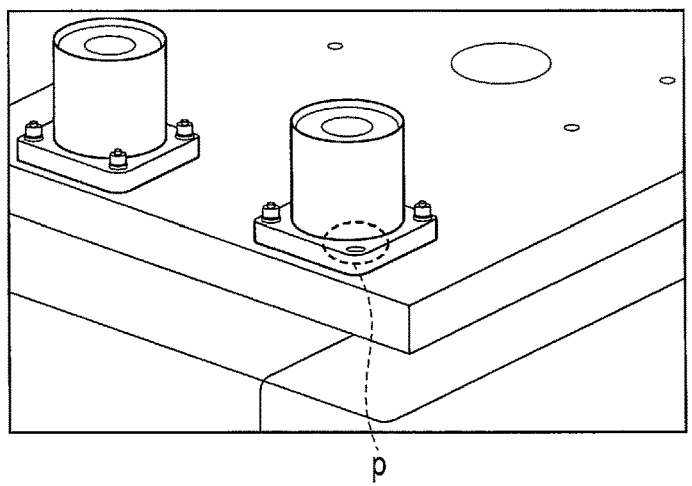
FIG. 5B is a diagram showing an example of a display process.
Figure 5C:
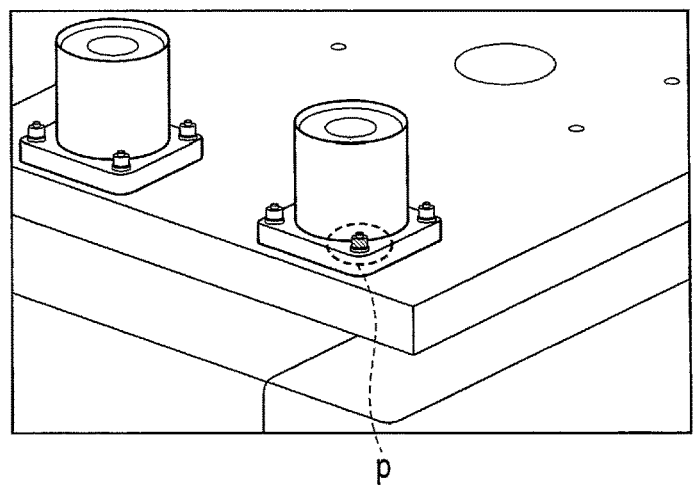
FIG. 5C is a diagram showing an example of a display process.

FIGS. 5A, 5B, and 5C are diagrams showing an example of a display process at step S8. Here, FIG. 5A shows an example of an image of a measurement target based on 3D CAD data. FIG. 5B shows an example of an image of a measurement target based on depth information measured by the camera 2. FIG. 5C shows an example of an image actually displayed at step S8. The image of FIG. 5A is generated by, for example, attaching a texture to the 3D CAD data. The image of FIG. 5B is generated by, for example, attaching a texture or color image data to the data on the measurement point cloud. The image of FIG. 5C can be generated by, for example, overlaying the image of FIG. 5A on the image of FIG. 5B, and emphasizing a differential portion. The alignment of the image of FIG. 5A and the image of FIG. 5B may be performed based on a matching result at step S8. The highlighting may be performed by various techniques such as changing the color of the differential portion, adding shades according to the difference, and displaying a frame, etc. indicating the differential portion.

FIG. 5A shows that, by design, the part p is bolted. On the other hand, as shown in FIG. 5B, in the image measured after the completion of the assembly, the part p is not bolted. Accordingly, in the image showing a comparison result, as shown in FIG. 5C, the part p is colored for display. By looking at the image of FIG. 5C, the user can recognize that the part p is not correctly assembled.

Here, in addition to the process of FIG. 3, the depth information and the color image measured by the camera 2 may be stored in the storage 104. Such depth information and color image can be used as evidence in a checking operation of part assembly.

As described above, according to the first embodiment, a point cloud in three-dimensional shape information that is a comparison target with respect to a measurement point cloud generated from depth information of the camera 2 is restricted according to the imaging range of the camera 2. Since a point cloud in a range that cannot be measured by the camera 2 need not be used for matching, the processing time for the matching can be reduced by restricting the point clouds of the three-dimensional shape information in advance. Thus, the measuring system 1 of the first embodiment can also cope with a real-time process.

There may be a case where a density of the measurement point cloud measured by the camera 2 and a density of a point cloud of the known three-dimensional shape information differ. In this case, when the ranges of the two point clouds that are compared differ, matching may not be performed at an appropriate position, depending on the characteristic amount. In the first embodiment, the restriction of the comparison target point cloud to make the range of the measurement point cloud and the range of the comparison target point cloud equivalent also leads to suppression of errors in matching.

Second Embodiment

Figure 6:
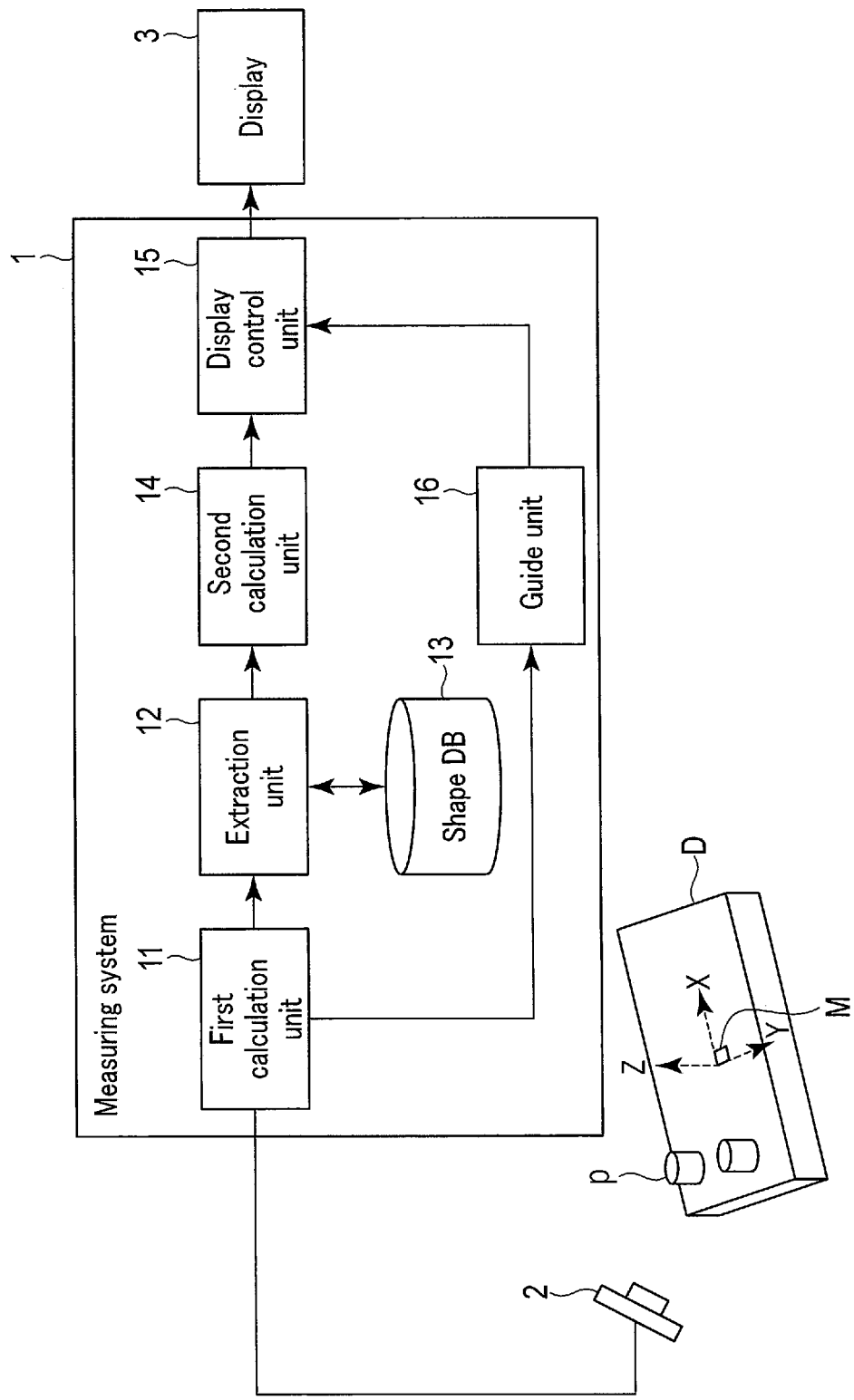
FIG. 6 is a block diagram showing a configuration of an example of a measuring system according to a second embodiment.

Next, the second embodiment will be described. FIG. 6 is a block diagram showing a configuration of an example of a measuring system according to the second embodiment. In FIG. 6, the same reference signs as those of FIG. 1 are assigned to elements similar to those in FIG. 1. A description of the elements similar to those in FIG. 1 is suitably omitted or simplified.

The measuring system 1 shown in FIG. 6 further includes a guide unit 16. The guide unit 16 receives first information calculated by a first calculation unit 11. The guide unit 16 performs a process for guiding the user in such a manner that the position and attitude of the camera 2 become suitable for acquisition of depth information. This process is, for example, a process of generating an image indicating the next measurement target. The image indicating the next measurement target may be, for example, a three-dimensional object that simulates the measurement target.

The display control unit 15 according to the second embodiment displays an image generated by the guide unit 16 on the display 3.

A hardware configuration of the measuring system 1 according to the second embodiment is basically similar to that of FIG. 2. In the second embodiment, the processor 101 may operate as a guide unit 16.

Figure 7:
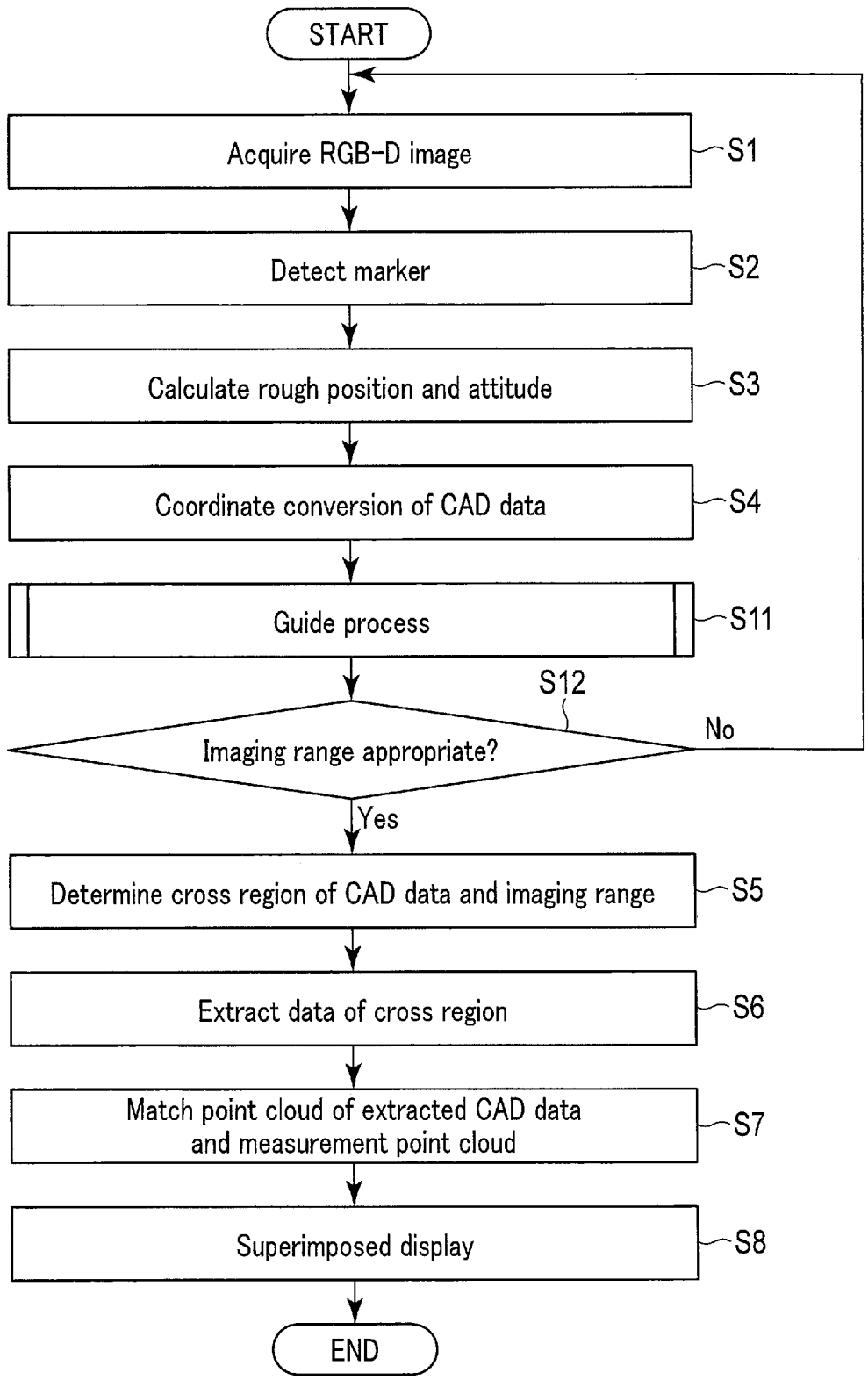
FIG. 7 is a flowchart showing an operation of the measuring system according to the second embodiment.

Next, the operation of the measuring system 1 according to the second embodiment will be described. FIG. 7 is a flowchart showing an operation of the measuring system 1 according to the second embodiment. The processing of FIG. 7 is executed by the processor 101. In FIG. 7, the same reference signs as those of FIG. 3 are assigned to processes similar to those in FIG. 3. A description of the processes to which the same reference signs as those in FIG. 3 are assigned will be suitably omitted or simplified.

Figure 8:
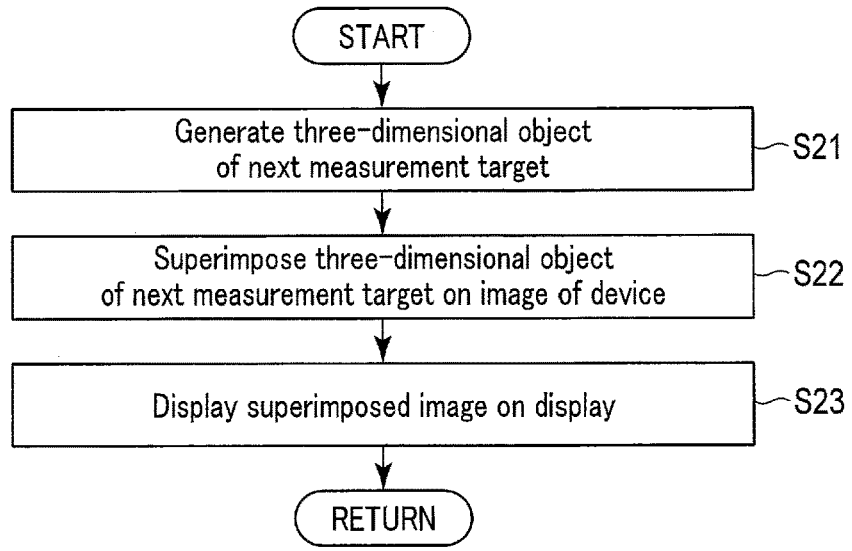
FIG. 8 is a flowchart showing a guide process.

The processing from step S1 to step S4 is the same as that in FIG. 3. At step S11, after coordinate conversion of 3D CAD data is performed at step S4, the processor 101 performs a guide process. After the guide process, the processing shifts to step S12. The guide process is a process for causing the display 3 to display a three-dimensional object for guiding the user on the display 3. Hereinafter, the guide process will be described. FIG. 8 is a flowchart showing a guide process.

At step S21, the processor 101 generates a three-dimensional object of the next measurement target for guidance. The three-dimensional object is a three-dimensional model that simulates the shape of the measurement target. When, for example, the measurement target is a part p assembled into the device D, the three-dimensional object may be a three-dimensional model that simulates the shape of the part p. Such a three-dimensional object may be stored in, for example, the storage 104. In this case, the processor 101 acquires a three-dimensional object corresponding to the next measurement target from the storage 104.

At step S22, the processor 101 superimposes a three-dimensional object of the next measurement target on, for example, a color image of the device D measured by the camera 2. The superimposition position of the three-dimensional object is the position of the next measurement target in the color image of the device D. Through the processing at step S3, the position and attitude of the camera 2 with respect to the device D with reference to the marker M is calculated. Based on the position and attitude of the camera 2, the position of the next measurement target in the color image can be specified. Here, it is desirable that the three-dimensional object superimposed on the color image be rotated according to the attitude of the camera 2 with respect to the device D. A description has been given at step S22 where the three-dimensional object of the next measurement target is superimposed on a color image measured by the camera 2. However, the configuration is not limited thereto. The three-dimensional object of the next measurement target may be superimposed on a depth image measured by the camera 2, or may be superimposed on 3D CAD data stored in the storage 104. That is, the three-dimensional object may be superimposed on a given image which allows the user to recognize the position and the direction of photographing of the next measurement target.

At step S23, the processor 101 displays a color image of the device D on which a three-dimensional object is superimposed on the display 3. Thereafter, the processor 101 terminates the processing in FIG. 8 and reverts to the processing in FIG. 7.

Figure 9A:
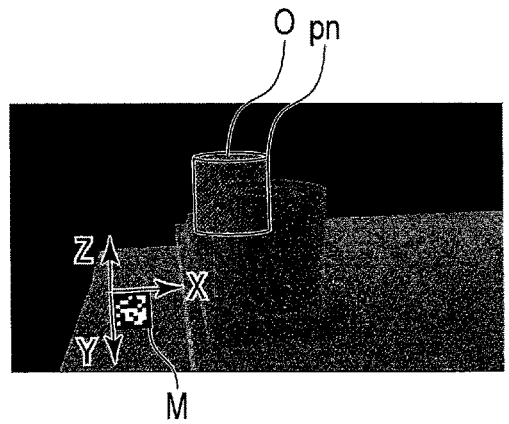
FIG. 9A is a diagram showing a display example of a three-dimensional object.
Figure 9B:
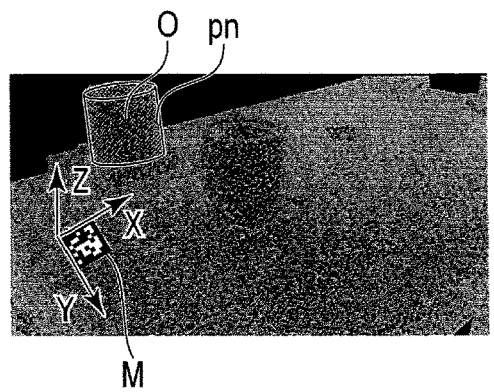
FIG. 9B is a diagram showing a display example of a three-dimensional object.

FIGS. 9A and FIG. 9B are diagrams showing a display example of a three-dimensional object. As shown in FIGS. 9A and 9B, a three-dimensional object O is superimposed on a position of a part pn of the next measurement target. By looking at the images of FIGS. 9A and 9B, the user can recognize where the next measurement target is positioned, and from where the next measurement target should be photographed. If the user looks at the image in FIG. 9A, for example, the user recognizes that the part pn of the next measurement target is hidden by another part, since the three-dimensional object O is superimposed on another part. In this case, the user may consider whether to change the direction of photographing of the camera 2 in such a manner that the image as shown in FIG. 9B is photographed.

Here, in addition to the processing in FIG. 8, a color image on which a three-dimensional object is superimposed may be stored in the storage 104. Such a color image can be used as evidence in a checking operation of part assembly.

Referring back to FIG. 7, a further description will be given. At step S12 after the guide process, the processor 101 determines whether the imaging range of the camera 2 is appropriate. At step S12, if it is determined that the imaging range of the camera 2 is appropriate, the processing shifts to step S5. At step S12, if it is determined that the imaging range of the camera 2 is inappropriate, the processing reverts to step S1. In this case, the user performs photography of a measurement target part again by changing the direction of photographing of the camera 2, while looking at the image displayed on the display 3.

A description will be given of the determination at step S12. Whether or not the imaging range of the camera 2 is appropriate is determined based on whether or not an adequate point cloud is acquired for the next measurement target. In the example of FIG. 9A, the part pn, which is the measurement target, is hidden by another part. A point cloud cannot be obtained from the portion hidden by another part. In such a case, it is determined that the imaging range is inappropriate. Thus, at step S12, if the range of overlap between the part p of the measurement target and the three-dimensional object O is equal to or lower than a threshold value, it may be determined, for example, that the imaging range is appropriate. At step S12, in addition to determination as to whether or not the range of overlap is equal to or less than a threshold value, it may be determined that the imaging range is appropriate when the size of the part p of the measurement target in the color image is equal to or greater than a threshold value.

At step S12, after the processing shifts to step S5, the processor 101 performs processing in a manner similar to that of the first embodiment. A description of the processing from step S5 to step S8 will be omitted.

As described above, according to the second embodiment, a process is implemented for guiding the user in such a manner that the position and attitude of the camera 2 become suitable for acquisition of the depth information, based on the position and attitude of the camera 2 with respect to the device D with reference to the marker M. Thereby, photography is performed at an appropriate position and attitude, resulting in suppression of errors when matching is performed between a measurement point cloud and a point cloud in the known three-dimensional shape information.

Also, in the second embodiment, a three-dimensional object indicating a part of the next measurement target is superimposed on, for example, a color image. This allows the user to be guided in such a manner that a part assembly checking operation is performed according to a predetermined order.

Modification

A modification of the first and second embodiments will be described. In the first and second embodiments, the measuring system 1 is used for measurement of a part assembly system. However, the measuring system according to the first and second embodiments may be applied to a given measurement system in which matching is performed between first point cloud data based on depth information measured by the camera 2 and second point cloud data distributed over a broader range than the first point cloud data. In this case, the processor 101 extracts, from the second point cloud data, point cloud data that forms a cross region with the imaging range of the camera 2.

In the first and second embodiments, the marker M is an AR marker. However, an AR marker that involves image recognition need not necessarily be used, and any marker capable of calculating the position and attitude of the camera 2 may be used. For example, other markers such as an optical marker may be used as the marker M. The optical marker is a marker that performs recognition based on a combination of a light-projecting element and a light-receiving element. By arranging three or more sets of optical markers on a surface of the device D, it is possible to calculate the position and attitude of the camera 2 with respect to the device D. Alternatively, a two-dimensional code, a bar code, a checkerbode, etc. may be used as the marker M.

Moreover, the camera 2 may be integrally configured with the measuring system 1 in the first and second embodiments. In this case, control of the position and attitude of the camera 2 may be performed by the measuring system 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A measuring system comprising a processor including hardware configured to:
    calculate first information with reference to a marker provided in a measurement target, the first information indicating a position and an attitude of a camera, and the camera configured to measure depth information indicating a depth to each point of the measurement target, along with an image of the measurement target;
    restrict first shape information to second shape information based on the first information, the first shape information indicating a known three-dimensional shape of the measurement target, and the second shape information indicating a three-dimensional shape corresponding to an imaging range of the camera;
    compare the depth information with the second shape information;
    calculate second information based on a result of the comparison between the depth information and the second shape information, the second information indicating the position and the attitude of the camera with a higher precision than the first information; and
    cause a display to display information relating to the result of the comparison between the depth information and the second shape information based on the second information.

2. The measuring system according to claim 1, wherein the processor guides a user of the camera in such a manner that the position and the attitude of the camera become suitable for acquisition of the depth information based on the first information.

3. The measuring system according to claim 2, wherein the processor guides the user of the camera by causing the display to display an object indicating the measurement target.

4. The measuring system according to claim 1, wherein the marker is an AR marker, and
    the processor detects the AR marker through image recognition with the image of the measurement target acquired by the camera.

5. The measuring system according to claim 4, wherein the image of the measurement target is a color image of the measurement target.

6. A computer-readable, non-transitory recording medium storing thereon a measuring program for causing a computer to:
    calculate first information with reference to a marker provided in a measurement target, the first information indicating a position and an attitude of a camera, and the camera configured to measure depth information indicating a depth to each point of the measurement target, along with an image of the measurement target;
    restrict first shape information to second shape information based on the first information, the first shape information indicating a known three-dimensional shape of the measurement target, and the second shape information indicating a three-dimensional shape corresponding to an imaging range of the camera;
    compare the depth information with the second shape information;
    calculate second information based on a result of the comparison between the depth information and the second shape information, the second information indicating the position and the attitude of the camera with a higher precision than the first information; and
cause a display to display information relating to the result of the comparison between the depth information and the second shape information based on the second information.

\* \* \* \* \*